(12) United States Patent
Davies

(10) Patent No.: US 8,120,510 B2
(45) Date of Patent: Feb. 21, 2012

(54) DATA LOGGING AND TRANSMITTING DEVICE

(75) Inventor: Samuel Richard Davies, Christchurch (NZ)

(73) Assignee: Data Acquisitions Limited, Christchurch (NZ)

( * ) Notice: Subject to any disclaimer, the term of this patent is extended or adjusted under 35 U.S.C. 154(b) by 988 days.

(21) Appl. No.: 11/632,297

(22) PCT Filed: Jul. 26, 2005

(86) PCT No.: PCT/NZ2005/000189
§ 371 (c)(1),
(2), (4) Date: Jan. 12, 2007

(87) PCT Pub. No.: WO2006/011816
PCT Pub. Date: Feb. 2, 2006

(65) Prior Publication Data
US 2008/0084329 A1    Apr. 10, 2008

(30) Foreign Application Priority Data

Jul. 29, 2004  (NZ) ........................................ 534414

(51) Int. Cl.
*G08C 19/06* (2006.01)
(52) U.S. Cl. ............................. 340/870.07; 340/870.11
(58) Field of Classification Search ............... 340/568.1, 340/572.1, 539.22, 870.02, 870.11, 870.07
See application file for complete search history.

(56) References Cited

U.S. PATENT DOCUMENTS

| | | | |
|---|---|---|---|
| 5,381,136 A | 1/1995 | Powers et al. | |
| 6,711,496 B2 * | 3/2004 | Denton | .......................... 701/207 |
| 6,853,894 B1 | 2/2005 | Kolls | |
| 6,995,669 B2 * | 2/2006 | Morales | .................... 340/539.31 |
| 2004/0075566 A1 | 4/2004 | Stepanik et al. | |

FOREIGN PATENT DOCUMENTS

| | | |
|---|---|---|
| WO | WO 96/13022 | 5/1996 |
| WO | WO 00/26111 | 5/2000 |

OTHER PUBLICATIONS

"Narrow Universal Data Logger" brochure [retrieved Oct. 17, 2005] available from http://www.etmpacific.com.au/content/products/etm_data_loggers/nudl_brochureR2.pdf. See whole document.

"Squirrel 2040 Data Loggers" brochure from Grant Instruments (Cambridge) Ltd [retrieved on Oct. 17, 2005] available from http://www.grantdataloggers.com/pdf/sq2040.pdf. See whole document.

* cited by examiner

*Primary Examiner* — Albert Wong
(74) *Attorney, Agent, or Firm* — Brannen Law Office, LLC

(57) ABSTRACT

A data logging device (1) that includes more than one communication devices (7), a stored instruction list (6), input ports (3), output ports (8), data buffers (4) and a processing unit (5); wherein: the data logging device (1) collects, processes and forwards data and/or predetermined signals to one or more external locations (10); the data/predetermined signal is independently transmitted to said one or more external locations (10) using one or more communication devices (7) and/or frequencies; such that, if a chosen communication device is not available, or cannot reliably transmit the data/predetermined signal to said one or more external locations (10), then the processing unit (5) consults the instruction list (6) and selects the next predetermined communication device (7), until transmission is successful or the instruction list (6) dictates another action.

32 Claims, 3 Drawing Sheets

DATA LOGGING AND TRANSMITTING DEVICE

FIELD OF THE INVENTION

Figure 1:
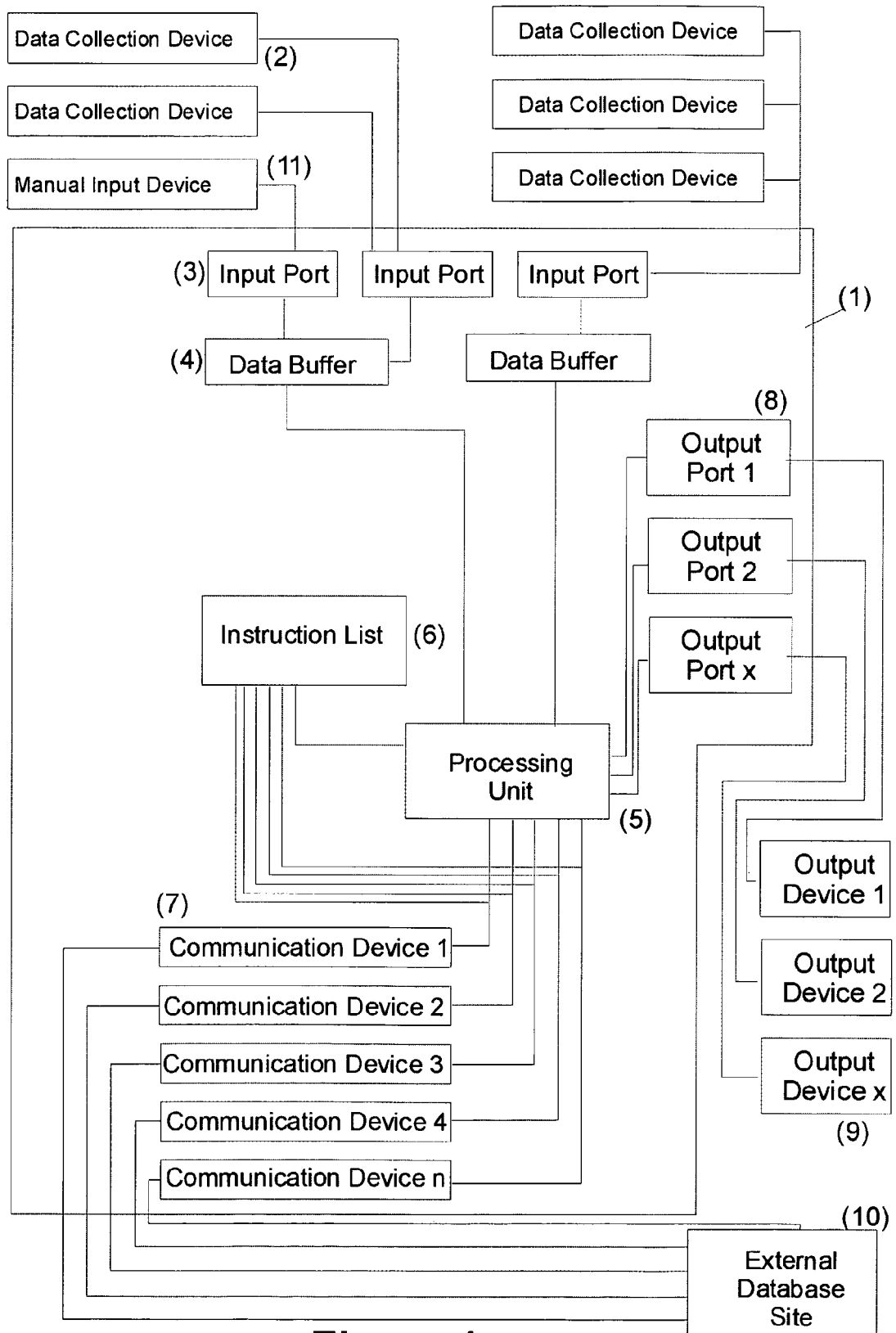

This invention relates to the field of data capture, logging and forwarding devices, specifically those which are required to have uninterrupted data recording and forwarding capabilities.

BACKGROUND

In industry and commerce the use of data collection and transmission has increased dramatically over the past 15 years, with data logging devices becoming smaller and more portable. This has meant that they are now used for many applications where any loss of data transmission can be critical. The use of data collection devices in remote or mobile locations has also become more prevalent. The continuous monitoring of shipments on trucks, ships, planes and trains to provide accurate information about the shipments' condition, location and expected arrival time has become more important.

The continuous transmission of data to a remote location at which action can then be taken, based on the data received in real time, has significant advantages over presently implemented systems. For example, monitoring a refrigerated shipment on a truck could alert the driver, allow for a technician to be dispatched and have it repaired before the shipment is damaged. The ability to monitor the position, speed and condition of a shipment allows corrective action to be taken before any problems get out of hand. The ability to detect and record when a shipment is tampered with, and ensure this information is transmitted to an external site in real time provides the opportunity to take action but also retain the evidence.

It is therefore an object of the invention to provide a device and method of data logging and transmission that maintains a near continuous connection to an external site by one or more communications means.

The present invention provides a data logging and transmitting device that includes more than one communication device, an instruction list stored in the data logging and transmitting device, one or more input ports, one or more output ports, one or more data buffers and one or more processing units; wherein in use:

(a) said data logging and transmitting device collects, processes and forwards data and/or one or more predetermined signals to one or more external location;

(b) the or each input port is connected to one or more data collection devices, the or each data collection device measuring or recording one or more parameter of the environment or equipment which is being monitored;

(c) the or each input port being connected to one or more data buffer, the or each data buffer storing data received from the data collection device;

(d) the or each processing unit reads the data stored in the or each data buffer and processes it according to the instruction list generating one or more data stream;

(e) the or each data stream is independently transmitted to one or more said external location and zero or more said output port;

(f) the data stream is independently transmitted to the or each external location using one or more communication devices, the or each communication device used, and/or frequency used by the or each said communication device, being determined by the instruction list.

(g) if the or each communication device chosen in the previous step is not available to, or cannot reliably, transmit the data stream to one or more remaining external location, said remaining external location being one or more external location that has not yet successfully received the data stream, then a next communication device or a next frequency, is used to transmit the data stream to the or each remaining external location, the or each next communication device, or next frequency, being determined by the instruction list;

(h) if the or each next communication device, or next frequency, chosen in step (g) is not available to, or cannot reliably, transmit the data stream to the or each remaining external location then a further next communication device, or next frequency, is used to transmit the data stream to the or each remaining external location, the or each next communication device, or next frequency, being determined by the instruction list;

in all cases the instruction list includes more than two communication devices to be used.

Preferably in use the data logging and transmitting device also carries out the following steps:

(i) step (h) is repeated until the data stream is successfully transmitted to the or each remaining external location or, if the data stream cannot be successfully transmitted to the or each remaining external location, the data stream is buffered for a predetermined time;

(j) if the data stream is buffered then after the predetermined time the data stream is independently transmitted to the or each remaining external location using one or more communication devices, the or each communication device used being determined by the instruction list.

Preferably the connection between the data collection device and the input port is made by a means selected from the group consisting of infra-red, wires, magnetic, wireless, ultrasonic, optical and microwave.

Preferably the or each input port can be reversibly connected to one or more user input device.

Preferably the or each user input device allows a user to interrogate and/or adjust the data logging and transmitting device.

Preferably the or each input port is connected to more than one data collection device.

Preferably the data collected is one or more form of data selected from the group consisting of video, audio, an analogue signal, a pulsed signal, a digital signal and a time based signal.

Preferably the or each input port can also function as an output port.

In a highly preferred form the data logging and transmitting device supports one or more of the following standards, communication protocols or input/output types which include: CAN (Controller Area Network), Network Bus systems, serial communications, wireless networks, J1939, RS-232, OBDII (protocol that operates on CAN hardware), GPRS (General Packet Radio System), Dallas 1-Wire Sensors, Packet Switching and CDMA (Code Division Multiple Access).

In a highly preferred form the or each communication device, or one or more communication protocols able to be used by the or each communication device, is chosen from the group consisting of CDMA (Code Division Multiple Access), Satellite modem, Iridium modem, standard modem, picture and video, serial communication, fibre optics, fax, voice message, UHF radio, VHF radio, infra-red transmitter/receiver, microwave transmitter/receiver, SMS (Short Message Service), text message, pager message, GPRS (General Packet Radio System), network adapter, ADSL modem, power line modem/network adapter, Bluetooth and wireless network adapter; in encrypted or unencrypted form.

Preferably the data logging and transmitting device can be connected to a manual input device through one or more of the input ports. The manual input device is selected from the list that includes switches, magnetic reader, scanners, virtual reality device, voice, touch screen, flash reader, optical reader, push buttons, a mouse, pressure sensitive tablets, keyboards, track balls, PDA (Personal Digital Assistant), Laptop Computers and cell phones. It is preferred that the manual input device can carry out one or more functions selected from the following group update the instruction list, download raw or processed data, request output of raw or processed data to an output device connected to an output port and request output of raw or processed data through one or more communication devices.

Preferably the or each data collection device is one or more device selected from the group consisting of GPS (Global Positioning System) device, DGPS (Differential GPS), temperature sensor, pressure sensor, humidity sensor, light sensor, micro switch, position sensor, chemical composition sensor, concentration sensor, voltage sensor, current sensor, colour sensor, movement sensor, infra-red sensor, x-ray sensor, radiation sensor, pulse sensor, magnetic sensor, optical sensor, resistance sensor, digital sensor, sonar sensor, ultraviolet sensor, tamper sensor, motion sensor, sound sensor, bar code reader, video camera, digital still camera, microphone, flow sensor and a transducer that converts a real world signal into an electrical signal; said electrical sensor may be either analogue or digital.

Preferably the or each output port is connected to one or more output device, such that said output device can be selected from the group consisting of a bar code printer, a printer, a label printer, a visual display unit, a removable data media device, a warning light, a speaker, a control device and an external data storage device.

Preferably the control device enables the data logging and transmitting device to control external equipment, either industrial, commercial or domestic equipment. This external equipment includes the environment control equipment for shipping containers and the transporting device or vehicle.

Preferably the data logging and transmitting device includes externally visible status lights.

Preferably the data logging and transmitting device is housed in an environmentally sealed container, all external input and output ports are similarly sealed.

Preferably the data logging and transmitting device is used to monitor shipments of goods, this monitoring includes position, speed and shipment condition.

Preferably the monitoring includes measuring various parameters of the transporting vehicle.

Figure 2:
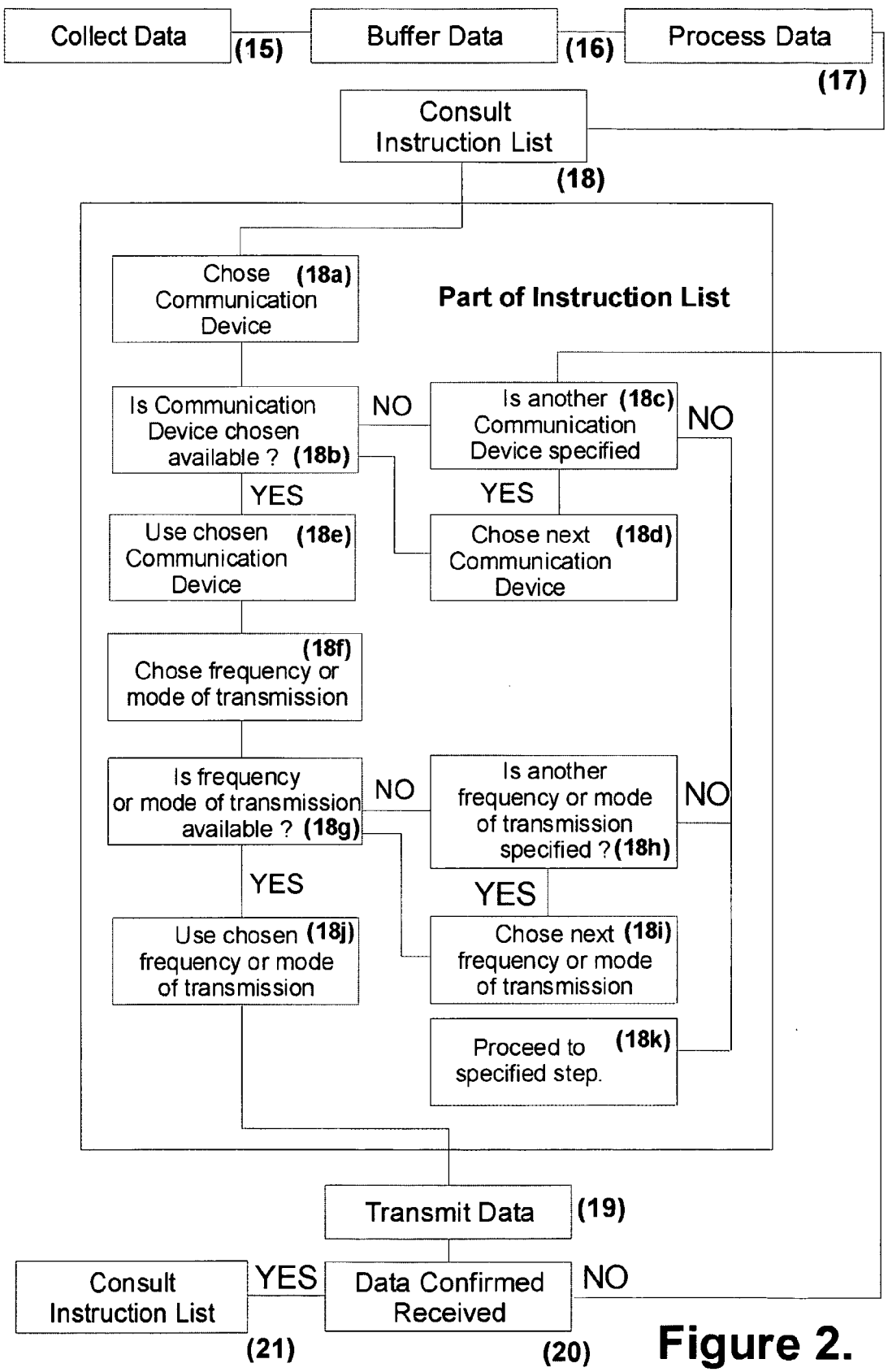

By way of example only, a preferred embodiment of the present invention is described in detail with reference to the accompanying drawings, in which FIG. 1. is a schematic diagram showing the data collection and transmitting device of the present invention;

FIG. 2. is a flow chart showing the operation of the data collection and transmitting device of FIG. 1.

Figure 3:
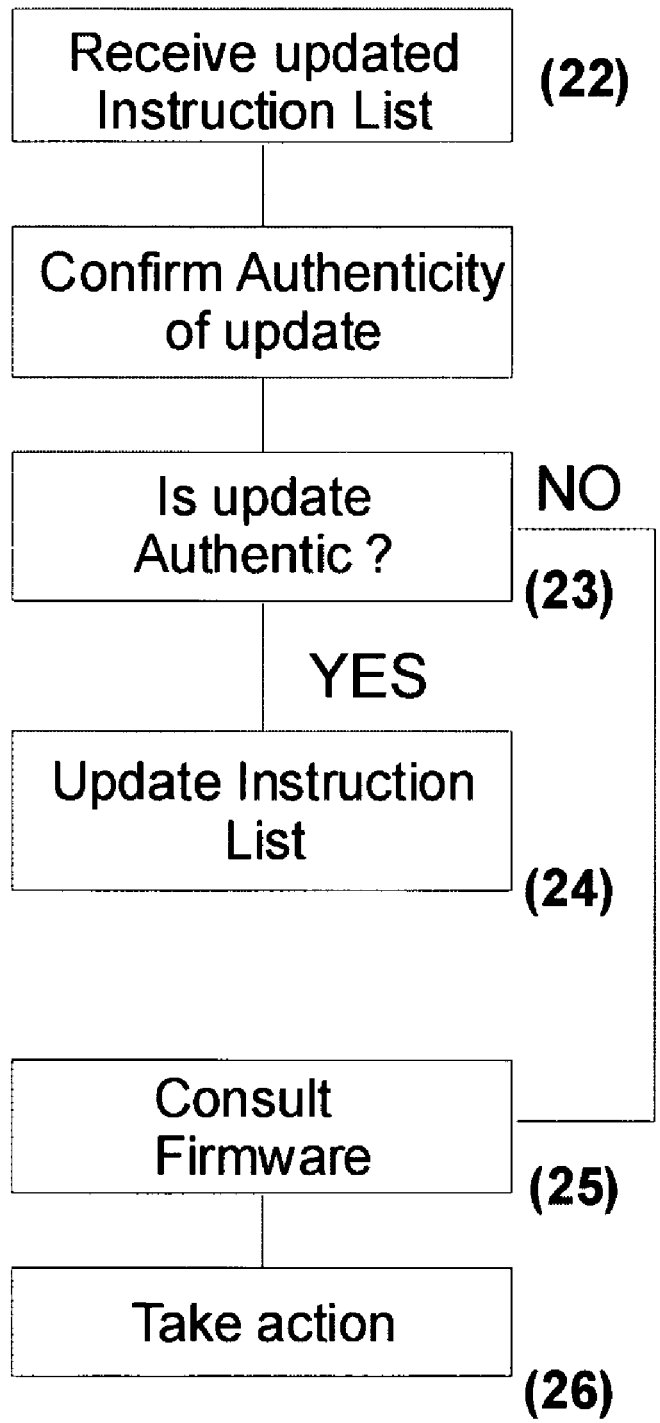

FIG. 3. is a flow chart showing the procedure for updating the instruction list of the device of FIG. 1.

Referring to FIG. 1 a preferred embodiment of the data collection and transmitting device (1), hereinafter referred to as the data logger, is shown. Internally the data logger (1) includes one or more input ports (3), one or more data buffers (4), a processing unit (5), an instruction list (6), two or more communication devices (7) and one or more output ports (8).

The data logger (1) is connected to one or more data collection device (2) that collect information from the environment or equipment in which the or each data collection device (2) is deployed, through one or more input port (3). The or each input port (3) is connected to one or more data buffers (4) that store and moderate the data flow to the processing unit (5), in accordance with a control setting. The or each data buffer (4) control setting is determined by an internally stored procedure and/or a signal received from the processing unit (5).

The processing unit (5) upon receiving the data from the or each data buffer (4) consults an instruction list (6), processes the data and carries out the appropriate instruction. The processed data and/or one or more predetermined signal is then routed by the processing unit (5) to one or more communication devices (7) and/or one or more output port (8). Each output port (8) is connected to one or more output device (9) which outputs the processed data in the desired form.

The or each communication device (7) forwards the processed data or predetermined signal to an external database (10), which confirms receipt of the processed data or predetermined signal to one or more communication device (7). The external database (10) may also update the instruction list (6), by sending an updated version to one or more communication device (7) to modify the behaviour of the data logger (1).

If the signal is not confirmed as received by the external database (10) then the processing unit (5) consults the instruction list (6) and selects the next predetermined communication device (7) and repeats the process until confirmation of receipt is received from the external database (10). If no signal is received from the external database (10) confirming receipt then the data is retained in the or each data buffer (4) and re-transmitted or stored for as long as possible.

The instruction list (6) can be updated by the external database (10). To update the instruction list (6) in the data logger (1) a signal is sent to one or more communication devices (7). This signal is then authenticated by the processing unit (5) or instruction list (6) itself, and either accepted if authentic, or rejected if not authentic. The update, whether successful or not, is confirmed by a predetermined signal being sent back to the external database (10).

In addition the data logger (1) can be accessed by a manual input device (11). This manual input device (11) can be as simple as a push button or switch, or more complex such as a mouse or pressure sensitive tablet. The manual input device (11) can also be a laptop computer, PDA (Personal Digital Assistant) or the like that can update the instruction list (6), and/or download the data in raw or processed form to itself or one of the output ports (8).

Referring to FIG. 2, a preferred data collection and communication sequence is shown as a flowchart.

(15) The data is collected from the data collection device (2) by the data logger (1).

(16) The data is buffered.

(17) The data is processed by the processing unit (5) into a desired form.

(18) The instruction list is consulted and the step (18a) actioned;

(18a) A communication device (7) is chosen;

(18b) The chosen communication device (7) checked to see if it is available; if it is, then step (18e) is actioned; if the communication device (7) chosen is not available, then step (18c) is actioned;

(18c) A check is carried out to determine if a next communication device (7) to be used is specified. If the next communication device (7) to be used is specified then step (18d) is actioned; if no further communication device (7) to be used is specified then step (18k) is actioned;

(18d) The next specified communication device (7) is chosen and step (18b) is actioned;

(18e) The chosen communication device (7) is selected;

(18f) The frequency or mode of transmission to be used by the communication device (7) selected is chosen;

(18g) The frequency or mode of transmission chosen is checked to see if it is available; if it is available, then step (18j) is actioned, if the frequency or mode of transmission chosen is not available, then step (18h) is actioned;

(18h) A check is carried out to determine if a next frequency or mode of transmission is specified. If a next frequency or mode of transmission is specified then step (18i) is actioned; if no next frequency or mode of transmission is specified, then step (18k) is actioned;

(18i) The next specified frequency or mode of transmission is chosen and step (18g) is actioned;

(18j) The chosen frequency or mode of transmission is selected and step (19) actioned;

(18k) The next specified step in the instruction list is actioned, this may be any action required to be taken, including returning to step (18a) and choosing another communication device (7) if any possible communication devices (7) are available, and/or instructing the or each data buffer to retain the data until full, or until a working communication device (7) is found;

(19) the data is transmitted using the communication device and frequency or mode of transmission selected;

(20) if the data is confirmed as received then the next step is determined by step (21), if the data is not confirmed as received then the next action is step (18c);

(21) the instruction list is consulted for the next step to be taken, the possible actions include, but are not limited to, continuing to transmit the data, transmitting a time code then continuing to transmit the data, continuing to transmit the data and transmitting a further signal to another external database (10) and transmitting a different signal through a second communication device.

Referring to FIG. 3, a preferred instruction list update process is shown as a flowchart.

(22) An updated instruction list is received.

(23) The authenticity of the updated instruction list is checked.

(24) If the updated instruction list is authentic then the data logger instruction list (6) is updated.

(25) If the updated instruction list is not authentic then the instruction list (6) is consulted to determine the next action.

(26) The next action is implemented, this can include locking out one or more communication port (7), sending a predetermined signal and locking out the data logger (1) to preserve the data.

It should be noted that this specific embodiment describes only one application of the invention and thus should not be interpreted as limiting the invention to this specific method or application.

The invention claimed is:

1. A data logging and transmitting device that includes more than one communication device, an instruction list stored in the data logging and transmitting device, one or more input ports, one or more output ports, one or more data buffers and one or more processing units;

wherein in use:

(a) said data logging and transmitting device collects, processes and forwards data and/or one or more predetermined signals to two or more independent external locations;

(b) the or each input port is connected to one or more data collection devices, the or each data collection device measuring or recording one or more parameter of the environment or equipment which is being monitored;

(c) the or each input port being connected to one or more data buffers, the or each data buffer storing data received from the data collection device;

(d) the or each processing unit reads the data stored in the or each data buffer and processes it according to the instruction list generating one or more data streams;

(e) the or each data stream is independently transmitted to said two or more independent external locations and zero or more said output ports;

(f) the data stream is independently transmitted to each of said two or more independent external locations using one or more of more than one communication device, the or each communication device used, and/or frequency used by the or each said communication device, being determined by the instruction list;

(g) if the or each communication device chosen in step (f) is not available to, or cannot reliably, transmit the data stream to one or more remaining external location, said remaining external location being one or more external location that has not yet successfully received the data stream, then a next communication device or next frequency, is used to transmit the data stream to the or each remaining external location, the or each next communication device, or next frequency, being determined by the instruction list;

(h) if the or each next communication device, or next frequency, chosen in step (g) is not available to, or cannot reliably, transmit the data stream to the or each remaining external location then a further next communication device, or next frequency, is used to transmit the data stream to the or each remaining external location, the or each next communication device, or next frequency, being determined by the instruction list;

in all cases the instruction list includes at least two communication devices to be selected from, and where each of said at least two or more independent external locations does not merely act as a relay to another external location specified in the instruction list.

2. The data logging and transmitting device as claimed in claim 1, wherein in use the following steps are included:

(i) step (h) is repeated until the data stream is successfully transmitted to the or each remaining external location or, if the data stream cannot be successfully transmitted to the or each remaining external location, the data stream is buffered for a predetermined time;

(j) if the data stream is buffered then after the predetermined time the data stream is independently transmitted to the or each remaining external location using one or more communication devices, the or each communication device used being determined by the instruction list.

3. The data logging and transmitting device as claimed in claim 1, wherein connection between the data collection device and the input port is made by a means selected from the group consisting of infra-red, wires, magnetic, wireless, ultrasonic, optical and microwave.

4. The data logging and transmitting device as claimed in claim 1, wherein the or each input port can be reversibly connected to one or more user input device.

5. The data logging and transmitting device as claimed in claim 4, wherein the or each user input device allows a user to interrogate and/or adjust the data logging and transmitting device.

6. The data logging and transmitting device as claimed in claim 1, wherein the or each input port is connected to more than one data collection device.

7. The data logging and transmitting device as claimed in claim 1, wherein the data collected is one or more form of data selected from the group consisting of video, audio, an analogue signal, a pulsed signal, a digital signal and a time based signal.

8. The data logging and transmitting device as claimed in claim 1, wherein the or each input port can also function as an output port.

9. The data logging and transmitting device as claimed in claim 1, wherein it supports one or more of the following standards, communication protocols or input/output types which include: CAN (Controller Area Network), Network Bus systems, serial communications, wireless networks, J1939, RS-232, OBDII (protocol that operates on CAN hardware), GPRS (General Packet Radio System), Dallas 1-Wire Sensors, Packet Switching and CDMA (Code Division Multiple Access).

10. The data logging and transmitting device as claimed in claim 9, wherein the or each communication device, or one or more communication protocols able to be used by the or each communication device, is chosen from the group consisting of CDMA (Code Division Multiple Access), Satellite modem, Iridium modem, standard modem, picture and video, serial communication, fibre optics, fax, voice message, UHF radio, VHF radio, infra-red transmitter/receiver, microwave transmitter/receiver, SMS (Short Message Service), text message, pager message, GPRS (General Packet Radio System), network adapter, ADSL modem, power line modem/network adapter, Bluetooth and wireless network adapter; in encrypted or unencrypted form.

11. The data logging and transmitting device as claimed in claim 1, wherein the or each input port can be connected to a manual input device.

12. The data logging and transmitting device as claimed in claim 11, wherein the manual input device is selected from the list that includes switches, magnetic reader, scanners, virtual reality device, voice, touch screen, flash reader, optical reader, push buttons, a mouse, pressure sensitive tablets, keyboards, track balls, PDA (Personal Digital Assistant), Laptop Computers and cell phones.

13. The data logging and transmitting device as claimed in claim 12, wherein the manual input device can carry out one or more functions selected from the following group update the instruction list, download raw or processed data, request output of raw or processed data to an output device connected to an output port and request output of raw or processed data through one or more communication devices.

14. The data logging and transmitting device as claimed in claim 1, wherein the or each data collection device is one or more device independently selected from the group consisting of GPS (Global Positioning System) device, DGPS (Differential GPS), temperature sensor, pressure sensor, humidity sensor, light sensor, micro switch, position sensor, chemical composition sensor, concentration sensor, voltage sensor, current sensor, colour sensor, movement sensor, infra-red sensor, x-ray sensor, radiation sensor, pulse sensor, magnetic sensor, optical sensor, resistance sensor, digital sensor, sonar sensor, ultra-violet sensor, tamper sensor, motion sensor, sound sensor, bar code reader, video camera, digital still camera, microphone, flow sensor and a transducer that converts a real world signal into an electrical signal.

15. The data logging and transmitting device as claimed in claim 1, wherein the or each output port is connected to one or more output device.

16. The data logging and transmitting device as claimed in claim 15, wherein the or each output device is selected from the group consisting of a bar code printer, a printer, a label printer, a visual display unit, a removable data media device, a warning light, a speaker, a control device and an external data storage device.

17. The data logging and transmitting device as claimed in claim 16, wherein the control device enables the data logging and transmitting device to control external equipment.

18. The data logging and transmitting device as claimed in claim 17, wherein the external equipment includes environment control equipment for shipping containers and the transporting device or vehicle.

19. The data logging and transmitting device as claimed in claim 1, wherein it includes externally visible status lights.

20. The data logging and transmitting device as claimed in claim 1, wherein it is housed in an environmentally sealed container with all external input and output ports similarly sealed.

21. The data logging and transmitting device as claimed in claim 1, wherein it is used to monitor shipments of goods.

22. The data logging and transmitting device as claimed in claim 21, wherein this monitoring includes position, speed and shipment condition.

23. The data logging and transmitting device as claimed in claim 2, wherein it is used to monitor shipments of goods.

24. The data logging and transmitting device as claimed in claim 23, wherein this monitoring includes position, speed and shipment condition.

25. The data logging and transmitting device as claimed in claim 2, wherein the or each output port is connected to one or more output device.

26. The data logging and transmitting device as claimed in claim 25, wherein the or each output device is selected from the group consisting of a bar code printer, a printer, a label printer, a visual display unit, a removable data media device, a warning light, a speaker, a control device and an external data storage device.

27. The data logging and transmitting device as claimed in claim 26, wherein the control device enables the data logging and transmitting device to control external equipment.

28. The data logging and transmitting device as claimed in claim 27, wherein the external equipment includes environment control equipment for shipping containers and the transporting device or vehicle.

29. The data logging and transmitting device as claimed in claim 2, wherein the or each input port can also function as an output port.

30. The data logging and transmitting device as claimed in claim 2, wherein the or each input port can be reversibly connected to one or more user input device.

31. The data logging and transmitting device as claimed in claim 30, wherein the or each user input device allows a user to interrogate and/or adjust the data logging and transmitting device.

32. The data logging and transmitting device as claimed in claim 2, wherein the or each input port is connected to more than one data collection device.

* * * * *